April 14, 1942. J. BLUE 2,279,613
FERTILIZER DISTRIBUTOR
Filed Nov. 7, 1939 2 Sheets-Sheet 1
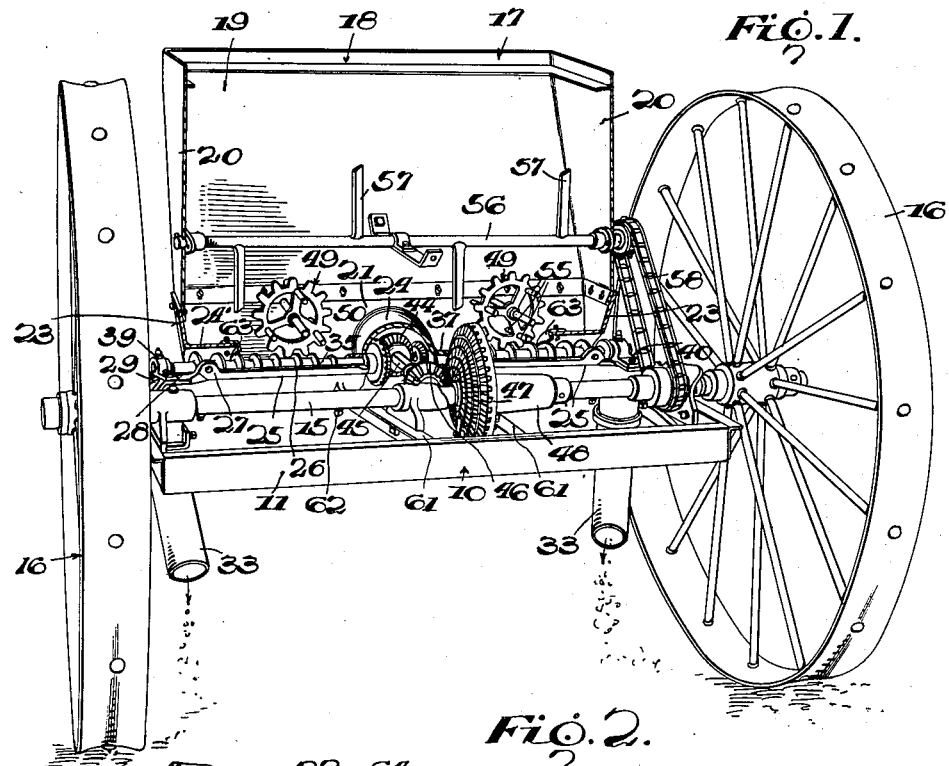
Fig. 1.
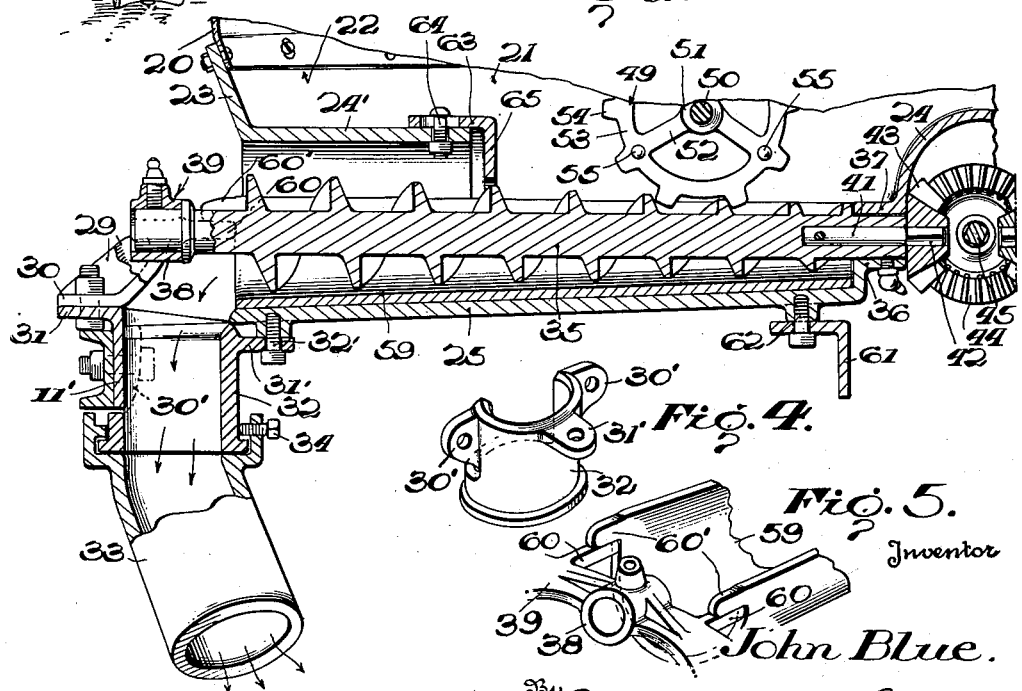
Fig. 2.
Fig. 4.
Fig. 5.
Inventor
John Blue.
By Cushman, Darby & Cushman
Attorneys

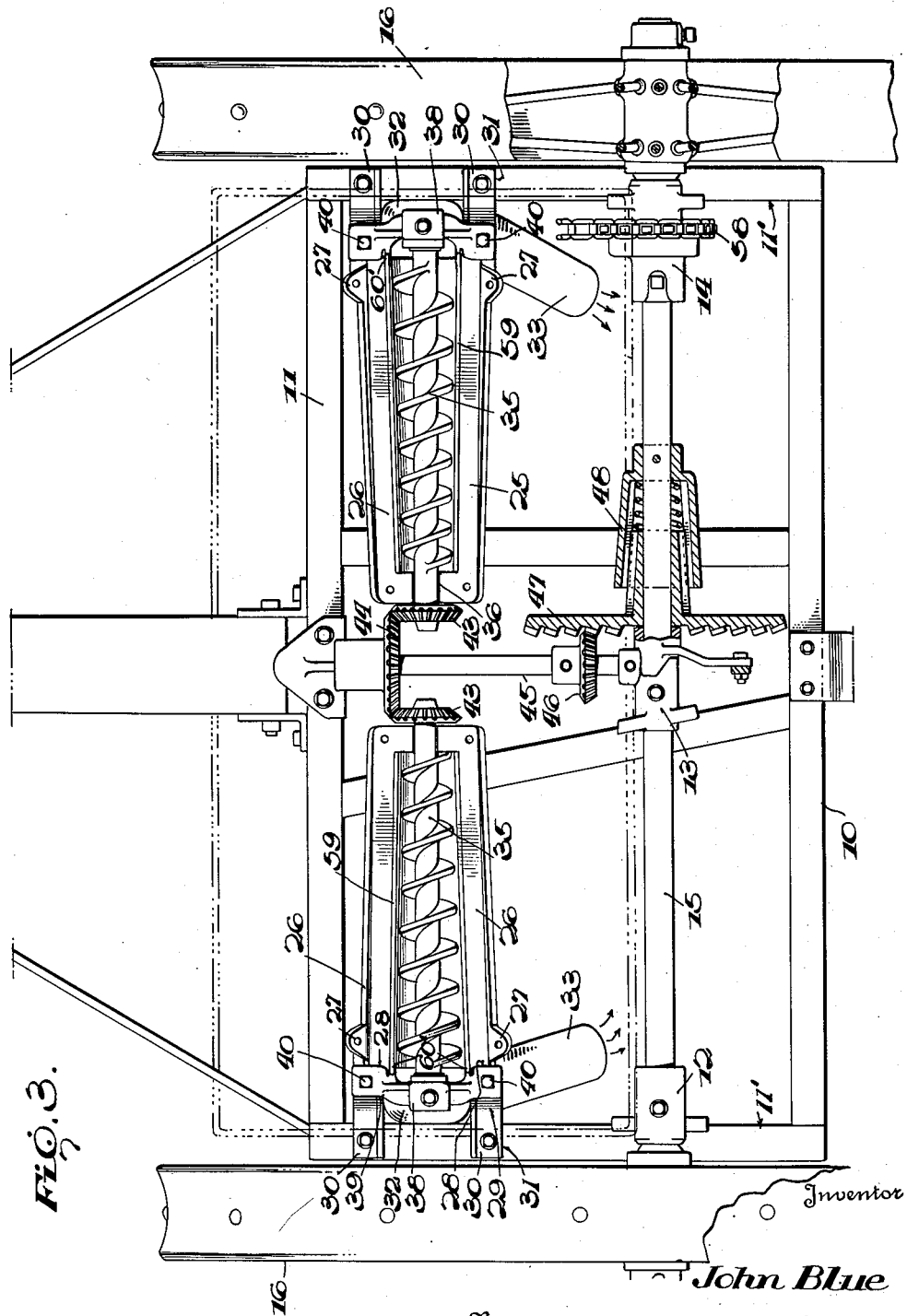

Patented Apr. 14, 1942

2,279,613

UNITED STATES PATENT OFFICE 2,279,613

FERTILIZER DISTRIBUTOR

John Blue, Laurinburg, N. C.

Application November 7, 1939, Serial No. 303,265

10 Claims. (Cl. 221—129)

The present invention relates to improvements in fertilizer distributors.

An object of the invention is the provision of a double row distributor in which various grades of fertilizers may be efficiently and evenly distributed. In this connection, the invention contemplates the use of a pair of identical and interchangeable conveyor units and transmission means for rotating said units in opposite directions so as to convey the material from the center to opposite sides of the distributor where it is discharged in double rows. The conveyor units, being identical, may thereby be produced in quantity production with a minimum of cost, and there is not the objectionable feature of having to keep in stock two different conveyor elements for each set.

A further object is to provide means for accommodating conveyor units of various sizes and shapes, depending upon the type of fertilizer to be distributed. This means comprises removable liners for the conveyor beds, which liners take up or reduce clearance between the beds and conveyors.

Another object is the provision of means which cooperate with the liners to insure the proper feeding of the material through the conveyors. This means comprises sets of caps or spacer elements which are detachably supported above the conveyors and project downwardly into close proximity thereto to control the passage of the material through the conveyors.

A still further object is to provide a set of agitators positioned above and operated by the conveyors, whereby the material to be distributed will not become clogged or difficult to handle by the conveyors.

With the foregoing and other objects in view, the invention will now be more particularly described, reference being had to the accompanying drawings in which:

Figure 1 is a perspective view of my invention, with the hopper partially cut away to show the conveyors, agitators, and the transmission means for operating the same from the distributor;

Figure 2 is an enlarged fragmentary view of one section of the lower portion of the distributor, showing one of the conveyors;

Figure 3 is a top plan view partially in section, with the hopper shown in dotted lines;

Figure 4 is a perspective view of the spout base, and

Figure 5 is a fragmentary view showing the arrangement of the lugs on the yoke and liner to prevent movement of the liner in operative position.

Referring now to the drawings, the numeral 10 designates generally my fertilizer distributor comprising a substantially rectangular frame 11 to which are suitably secured bearings 12, 13, and 14 in which the main shaft 15 of the vehicle is journaled. This shaft extends outwardly from both ends of the frame 11, and upon these outwardly extending portions are mounted the wheels 16 which support the entire mechanism and which are utilized to transport the distributor from place to place.

A hopper 17 is mounted transversely of the distributor between the wheels 16 and comprises a body 18 having side walls 19 which are inclined inwardly and downwardly and which connect with end walls 20. The body 18 terminates adjacent the lower end of the hopper and is supported upon and suitably secured to a hopper base 21. This base is provided with inclined side walls 22 overlapping the lower ends of the side walls 19 of the body. The hopper base also has end walls 23 connecting the side walls 22 and arranged in overlapping relation to the end walls 20 of the hopper body. The hopper base is open at its lower end except for a centrally disposed substantially semi-circular bridge 24, the purpose of which will be explained in detail hereinafter. Each end wall 23 of the hopper base is provided with an inturned portion forming a curved bridge or tunnel 24' which is adapted to overlie one of the conveyor units, as will shortly be described in greater detail.

The hopper base 23 is directly supported upon a pair of trough-shaped elements 25 constituting conveyor beds. The longitudinal edges of each bed 25 terminate in longitudinally extending flanges 26 which embrace the lower longitudinal edges of the hopper base and close the openings in the base. Suitable ears 27 which project outwardly from the flanges 26 are employed to secure the conveyor beds to the hopper base. The flanges 26 beyond their respective ears 27 are formed, each with a flattened portion 28, the extreme end of which is inclined downwardly and outwardly as at 29 and finally terminates in a flattened end foot 30. The feet 30 of each bed rest upon and are secured to the upper flange 31 of one of the side rails 11' of the frame 11 (see Figure 2). A pair of spout bases 32 are mounted, one at each end of its respective bed 25. Each spout base is substantially cylindrical in formation and is cut away adjacent its upper outer end (see Figure 4). This cut away portion faces the rail 11' and ears 30' project from opposite sides thereof and constitute means for clamping the spout base to the rail. Each spout base is also provided with an inwardly projecting lug or ear 31' which underlies the outer end of its respective bed and is secured thereto by a threaded bolt 32². This bolt passes through an opening in the lug 31' and is threaded into a threaded opening in the conveyor bed (see Figure 2). Each spout base is connected to a discharge spout 33 which is detachably mounted thereon by means of a screw bolt 34.

Referring particularly to Figures 2 and 3, it will be observed that a pair of screw conveyors 35 are mounted within the conveyor beds 25. These conveyors conform to the beds, and, as shown, gradually increase in size from the inner to the outer ends. The inner end of each conveyor 35 is journaled in a bearing formed partly in the inner end of the bed and partly in the central bridge 24. That is, the extreme inner end of each bed 25 is provided with a substantially semi-annular conveyor receiving socket 36, while the bridge is formed on opposite sides with corresponding and cooperating semi-annular socket elements 37. The outer extremity of each conveyor is journaled in a bearing 38 which is formed integral with and located centrally of a yoke or strap 39. Each end of each strap is secured to one of the flat portions 28 of the flange 26 by means of a suitable fastening element 40.

The inner end of each conveyor 35 terminates substantially flush with the inner wall of the bridge 24 (see Figure 2) and is provided with a recess or opening within which is secured a pin or stub shaft 41. This element has a squared end 42 projecting from the conveyor and upon which a pinion 43 is mounted. If desired, the stub shaft 41 may be eliminated, and the shank of the conveyor provided with a reduced squared portion for receiving the pinion 43. Furthermore, a cotter pin or other fastening means (not shown) may be utilized to secure the pinion 43 to the member 42, although this is not necessary, since it may be maintained in operative position on the conveyor by contact with a gear wheel 44. The gear 44 meshes with the pinion 43, as well as with the corresponding pinion secured to the conveyor located on the other side of the bridge 24.

Referring particularly to Figure 3, it will be observed that the conveyors 35 are identical in construction and are, therefore, interchangeable. Each conveyor is capable of being easily and quickly inserted and removed from its respective bed 25, and this is accomplished by removing the bolts 40 from the yoke 39. Thereupon, the bearing 38 may be removed from the outer end of its respective conveyor and the conveyor slipped out of the bed. If the construction is such that a cotter pin retains the pinion 43 upon the end of the conveyor, it will, of course, be necessary to first remove this pin. It will be appreciated that there is considerable advantage in making both conveyors of each set identical. They may be made in quantity production, and there is not the objectionable feature of having to keep in stock two different conveyor elements for each set. Furthermore, no care is needed in replacing a set of conveyors, since each conveyor of a set is identical and, therefore, interchangeable.

In view of the fact that the conveyors 35 are identical in formation, it is, of course, necessary to provide transmission means for rotating them in opposite directions, in order that the material is fed outwardly from the center of the hopper. This is accomplished by providing a compact and efficient transmission means comprising the gear 44, meshing with the gears 43 and fixed upon a centrally disposed rotatable shaft 45. This shaft is supported in bearings mounted in the frame 11 and is connected to a second gear wheel 46 secured to the other end of the shaft. The gear 46 is mounted for adjustment on the shaft 45 so that it may register with one of a plurality of sets of gear teeth formed on a large ring gear 47. Gear 47 is carried by the main shaft 15, and any suitable clutching mechanism 48 may be employed to disconnect the ring gear and the rest of the conveyor operating mechanism from the shaft 15 to permit the distributor to be transferred from place to place without actuation of the conveyors.

It will be apparent that when the clutch 48 is connected to the ring gear 47, rotation of the shaft 15 will rotate the gear 47 which, in turn, will rotate the shaft 45. This will operate the gear wheel 44 which will rotate one pinion 43 and its corresponding screw conveyor 35 in one direction, while the other pinion 43 and its screw conveyor are rotated in the opposite direction. This operation of the screw conveyors will gradually move a predetermined amount of the material toward the outer end of the hopper where it will be discharged in double rows through the discharge spouts 33.

In order that the fertilizer or other material in the hopper will not become caked or clogged, means are provided to agitate the material directly above the two screw conveyors. This means comprises a pair of agitator wheels 49, each of which is fixed to a cross shaft 50 mounted transversely of the hopper. Each wheel 49 comprises a hub 51 and spokes 52 connecting the hub to a peripheral ring 53. This ring is provided with a plurality of teeth 54 which mesh with their respective screw conveyor 35. Thus, motion is imparted to each agitator 49 through its screw conveyor 35. In order that the material may be thoroughly agitated before it passes to the conveyors, each wheel 49 is provided with a plurality of lugs or pins 55 which project laterally from opposite sides of the ring 53 (see Figures 1 and 2).

In addition to the agitator wheels 49, it is preferred to provide additional agitating means at other points in the hopper. This means comprises a shaft 56 extending longitudinally of the hopper and journaled in opposite ends thereof. This shaft is provided with a plurality of arms 57 which are adapted to stir up and agitate the material when the shaft 56 is rotated. Operating means for the shaft 56 comprises a sprocket wheel and chain mechanism 58 which takes power from the main shaft 15.

In order that different kinds or grades of fertilizers or other materials may be efficiently distributed, it is necessary that different types and sizes of conveyor units be employed. In other words, one kind of fertilizer may be most efficiently distributed by a relatively small screw conveyor, while it is necessary to provide a relatively large conveyor to efficiently distribute another type fertilizer. The present construction is particularly adapted to not only permit the easy removal and insertion of different types of conveyor units, but also provides means for taking up any clearance to compensate for conveyors of different sizes. For instance, if a large screw conveyor is replaced by a relatively small one, it will be apparent that some means must be provided to close the space between the lower portions of the conveyor and the conveyor bed; that is, to take up the clearance between the bed and the small conveyor. This is accomplished by providing liners of different degrees of thickness according to the type of conveyor used.

Referring particularly to Figure 2, it will be observed that an intermediate type of conveyor 35 is mounted in bed 25. Therefore, it is necessary that a liner 59 be mounted in the conveyor bed in order to take up the space or reduce the clearance between the bed and conveyor so that the conveyor will function properly. Each liner is of the general formation of the conveyor bed; that is, of trough-shaped formation and is adapted to be slipped into operative position upon its respective bed before the conveyor is mounted in the bed. In this connection, when it is desired to change a set of conveyors, and assuming that a large set is being replaced by a smaller set, each liner is first slipped into position and then one of the conveyors is inserted, so that its inner end engages the inner bearing. Thereafter, the outer bearing 39 is slipped over the outer end of the conveyor shaft and the strap or yoke 38 secured to the flange 31. The yoke is formed with spaced lugs 60, one on each side of the bearing 39. These lugs contact the outer edge of the liner 59 and engage complementary lugs 60' projecting outwardly from opposite sides of the liner. This construction will not only prevent longitudinal movement of the liner within the bed, but will also hold the liner against turning or rotating movement in the bed. It is to be understood that a similar liner will be mounted in the bed on the opposite side of the hopper, to compensate for the clearance between this bed and its conveyor. Referring to Figure 2, it will be observed that the inner end of each conveyor bed is mounted upon one of a pair of inner cross rails 61. Threaded bolts 62 are employed to secure the beds to the rails 61.

In addition to providing means for reducing the clearance in the lower end of each screw conveyor, means are also provided to close the space or opening between the inner end of each tunnel or bridge 24' and the top of its respective screw conveyor. This comprises a conveyor cap 63 which is detachably connected by suitable fastenings 64 to the inner end of the tunnel 24'. This cap includes a downwardly depending curved or arcuate portion 65 which partially encircles the top portion of the conveyor and terminates in close proximity thereto so as to provide just the right clearance and thereby prevent the escape of material over the top of the conveyor. In order to accommodate different sizes and types of conveyors, a plurality of various sized caps 63 are provided so that the correct amount of clearance may be obtained for each type of conveyor unit.

In view of the foregoing, it will be apparent that not only may different types and sizes of conveyor units be quickly and easily assembled and removed from the distributor, but that means such as the liners and conveyor caps are employed to insure the correct clearance for each type of conveyor.

It is to be understood that the form of the invention shown and described is illustrative of the preferred embodiment, and that such changes may be made without departing from the spirit of the invention as fall within the purview of one skilled in the art and the scope of the appended claims.

I claim:

1. In a fertilizer distributor, a frame, a hopper mounted on said frame and extending transversely thereof, said hopper having a central bridge dividing the lower portion of the hopper into a pair of chambers, discharge spouts communicating with said chambers, a pair of identical and interchangeable conveyor elements mounted in said chambers, with the inner end of each element journaled in a wall of said bridge, and transmission means for said conveyor elements positioned beneath said bridge and operatively connecting the inner ends of said elements for rotating said elements in opposite directions.

2. In a fertilizer distributor, a frame, a hopper mounted on said frame and extending transversely thereof, said hopper having a central bridge dividing the lower portion of the hopper into a pair of chambers, discharge spouts communicating with said chambers, a pair of identical and interchangeable conveyor elements mounted in said chambers, with the inner end of each element journaled in a wall of said bridge, and transmission means for said conveyor elements including a pair of pinions, one connected to the inner end of a conveyor element and positioned under the bridge in spaced relation to the other pinion, and a centrally disposed gear wheel meshing with said pinions and adapted when rotated to rotate the pinions and conveyor elements in opposite directions.

3. In a fertilizer distributor, a frame, a hopper mounted on said frame, a pair of identical and interchangeable screw conveyors mounted in spaced relation in the lower portion of the hopper and adapted to convey material to opposite ends of the conveyors, a pair of discharge spouts communicating with the conveyors to receive material therefrom, and a common transmission mechanism operatively connected to the inner ends of the screw conveyors for rotating said conveyors in opposite directions.

4. In a fertilizer distributor, a frame, a hopper mounted on said frame and extending transversely thereof, said hopper having a central bridge dividing the lower portion of the hopper into a pair of chambers, a pair of identical and interchangeable screw conveyors journaled in said chambers, a discharge spout positioned at the outer end of each chamber, a pinion detachably secured to the inner end of each conveyor shaft exteriorly of its chamber and beneath the bridge, means for rotating said pinions and screw conveyors in opposite directions, and bearing brackets detachably secured to the frame exteriorly of the hopper, each bracket having a bearing socket receiving the outer end of a screw conveyor.

5. In a fertilizer distributor, a frame, a hopper mounted on said frame and having a lower portion constituting a conveyor bed, a screw conveyor detachably mounted in said conveyor bed and adapted to transfer material to the exterior of the hopper, and a liner partially surrounding the screw conveyor and detachably secured to said conveyor bed to take up clearance between the bed and conveyor and thereby permit the use of different size conveyors in said hopper.

6. In a fertilizer distributor, a frame, a hopper mounted on said frame and having a substantially trough-shaped lower portion constituting a conveyor bed, a conveyor detachably mounted in said conveyor bed and adapted to transfer material to the exterior of the hopper, a yoke detachably mounted on the outer end of said bed and having a bearing receiving the outer end of the conveyor, said yoke having a pair of spaced inwardly projecting lugs positioned on opposite sides of the bearing, and a trough-shaped liner detachably secured to said conveyor bed to take up clearance between the bed and conveyor and thereby permit the use of different size conveyors in said hopper, said liner having a pair of spaced lugs at its outer end engageable with the lugs on said yoke to prevent longitudinal and transverse movements of the liner relative to the conveyor bed.

7. In a fertilizer distributor, a frame, a hopper mounted on said frame and having a substantially trough-shaped lower portion constituting a conveyor bed, a conveyor detachably mounted in said conveyor bed and adapted to transfer material to the exterior of the hopper, a trough-shaped liner detachably secured to said conveyor bed to take up clearance between the bed and conveyor, a section of said hopper forming an opening through which the outer end of the conveyor projects, and a cap detachably carried by said hopper section above the conveyor and having a portion thereof projecting downwardly into close proximity to the conveyor and cooperating with the liner to permit the use of different size conveyors in said hopper.

8. In a fertilizer distributor, a frame, a hopper mounted on said frame and having a substantially trough-shaped lower portion constituting a conveyor bed, a conveyor detachably mounted in said conveyor bed and adapted to transfer material to the exterior of the hopper, one wall of said hopper having an inwardly extending curved section overlying the bed plate and forming therewith a passageway surrounding the outer portion of the conveyor, and a cap detachably secured to said curved section and having a depending curved portion positioned in close proximity to the conveyor and controlling the discharge of material to the exterior of the hopper.

9. In a fertilizer distributor, a frame, a hopper mounted on said frame and having a substantially trough-shaped lower portion constituting a conveyor bed, a conveyor detachably mounted in said conveyor bed and adapted to transfer material to the exterior of the hopper, a trough-shaped liner detachably secured to said conveyor bed to take up clearance between the bed and conveyor and thereby permit the use of different size conveyors in said hopper, and interengaging means on said frame and liner to prevent longitudinal and transverse movements of the liner relative to the conveyor bed.

10. In a fertilizer distributor, a frame, a hopper mounted on said frame and having a substantially trough-shaped lower portion constituting a conveyor bed, a conveyor detachably mounted in said conveyor bed and adapted to transfer material to the exterior of the hopper, a yoke detachably mounted on the outer end of said bed and having a bearing receiving the outer end of the conveyor, a trough-shaped liner detachably secured to said conveyor bed to take up clearance between the bed and conveyor and thereby permit the use of different size conveyors in said hopper, and interengaging means on said liner and yoke to prevent longitudinal and transverse movements of the liner relative to the conveyor bed.

JOHN BLUE.